Patented Aug. 14, 1928.

1,681,124

UNITED STATES PATENT OFFICE.

EMIL A. LUCAS, OF WASHINGTON, PENNSYLVANIA, ASSIGNOR TO MOLYBDENUM CORPORATION OF AMERICA, OF PITTSBURGH, PENNSYLVANIA, A CORPORATION OF DELAWARE.

PROCESS OF MANUFACTURING MOLYBDENUM ALLOYING COMPOUNDS.

No Drawing.   Application filed December 30, 1924.   Serial No. 758,917.

In my copending patent application Serial No. 758,916, filed of even date herewith there is disclosed a composition for alloying molybdenum with another metal, such as iron and steel, but particularly with steel, regardless of whether it be plain carbon steel or steel alloyed, or intended to be alloyed, with an element or elements other than molybdenum.

The composition therein disclosed comprises a fused coherent hard mass containing molybdenum in a combined form, it being chiefly combined with oxygen. In its preferred form the composition also includes a fluxing agent for protecting the molybdenum against sublimation when the composition is introduced into a bath of molten metal, for facilitating the spreading of the composition in a fluid state, and for carrying off certain products of reduction of the molybdenum oxide. The materials, and the quantities of them, which enter into the fluxing agent may render the composition either neutral, acid or basic. The particular materials used, or made use of, in forming the fluxing agent are preferably calcium oxide, iron oxide, and silica, although other materials may be used, or may be found in the composition because of their presence in the materials of which the composition is made.

The object of this invention is to provide a simple and inexpensive process of producing the composition just explained.

According to the invention, a body containing molybdenum is so subjected to heat, preferably in a furnace, that there is produced a fused mass containing molybdenum combined chiefly with oxygen, the mass being in the form of slag, which when it is cooled is hard and coherent and contains the combined molybdenum distributed substantially uniformly throughout the body. This method contemplates the manufacture of the composition from various molybdenum ores, including molybdenite and wulfenite or lead molybdate, although the preferred method of forming the composition is by the use of molybdenite. The invention will be further explained, first with reference to the use of molybdenite, and then with reference to the use of wulfenite.

Molybdenite, which is a molybdenum ore containing sulphur and usually containing also silica, calcium oxide or fluoride, and iron oxide or sulphide in varying proportions, is first roasted to remove its sulphur content. The roasted body, in which the molybdenum is chiefly in the form of a trioxid and the other elements in the form of various oxides, is then fused. While the fusing may be variously effected, it is preferably done in an electric furnace in the presence of a reducing agent which may be the carbon electrode and carbon lining of an electric arc furnace. When it is desired to produce the preferred form of composition, that is to say a composition containing a fluxing agent, the material for forming the fluxing agent is added to the roasted mass and sintered or fused with it to form the alloying composition.

This manner of practicing the invention may be fully understood from the following detail explanation of the manufacture of various forms of the composition, it being understood that the details of the process and the examples of the composition are given by way of example and not of limitation.

In the roasting step, a molybdenite concentrate, preferably containing from about 75% to 85% molybdenum sulphide, is subjected to a heat of from about 450° to 550° C., under oxidizing conditions to remove the sulphur. When the molybdenite is thus heated its sulphides are converted into oxides, the roasted body then comprising principally molybdenum trioxide, and the oxides of various other elements found in the molybdenite, principally silicon, iron and calcium.

To fuse the roasted body it may be charged into an electric arc furnace, carrying for example 55 to 60 volts and operating at 75 to 100 kilowatts per hour input, and the body heated to a temperature of from about 1200° to 1500° C. The mass is held at this temperature until the desired point of fusion and reduction is reached, the reduction being accomplished by contact of the mass with the carbon walls of the furnace and with the carbon electrode which is immersed in the mass. The proper point of reduction may be judged by the appearance of the composition by removing some of it by a ladle or rod and cooling and examining it to determine whether complete fusion has taken place and whether the molybdenum trioxide has been substantially reduced to lower oxides without completely reducing any appreciable quantity of it. It has been found that the proper degree of reduction may be attained when the mass is held in the furnace for ten or fifteen minutes after complete fusion. However, this, as well as the temperature to which the mass is heated, varies according to the amount of fluxing agents present in the roasted mass or added to it. After fusion and reduction, the fused mass is then tapped from the furnace and flows into suitable receptacles in which it solidifies into hard coherent bodies.

As previously explained, the composition is preferably rendered more suitable for use in acid or basic processes of metal manufacture by the addition of various fluxing agents to the roasted body of molybdenite. Assuming by way of example that the roasted body contains about 70% molybdenum oxides, principally molybdenum trioxide, 14% silica, 3% calcium oxide, 12% iron oxide, and the remainder impurities such as alumina and manganese oxide, and that it is desired to produce a neutral alloying composition for use in either a basic or acid process of steel manufacture, the fusing furnace may be charged on the basis of about 80 lbs. of roasted molybdenite, to 21 lbs. of calcium oxide, 6 lbs. of silicon and 5 lbs. fluorspar. When fused, the resulting composition will contain by analysis about 35 to 38% molybdenum chiefly in the form of oxides, although a small part may be combined with iron or other elements of the fluxing agent, about 22% calcium oxide, 15.5% silica, 9.0% iron oxide and 3% calcium fluoride. The relative percentages of the several materials present in this composition are such as to render the composition neutral, or substantially so, and suitable for use in either a basic or acid process of steel manufacture.

It will be observed that the percentages given of the several material forming the composition do not total 100%. The remainder of the composition consists of incidental concomitants present in the material charged in the furnace, such as alumina and magnesia, but chiefly of oxygen combined with molybdenum.

When it is desired to produce a basic composition for use in a basic process of metal manufacture, the fusing furnace may be charged on the basis of 80 lbs. of roasted molybdenite of the approximate analysis given above, to 20 lbs. of iron oxide, 6 lbs. of calcium oxide and 5 lbs. of fluorspar. The resulting composition will contain by analysis about 35% molybdenum combined chiefly with oxygen, 29% iron oxide, 10% silica, 8% calcium oxide and 3% calcium fluoride, the remainder being, as stated with reference to the first example, concomitants present in the material charged in the furnace, and oxygen combined with the molybdenum.

It will be understood that the bases in this composition may be substituted one for the other in part or entirely. For instance, the charge may be so proportioned that the resulting composition contains 35 to 38% molybdenum combined chiefly with oxygen, 29% calcium oxide, 10% silica, 9.0% iron oxide and 3% calcium fluoride.

In manufacturing an acid composition for use in an acid process, the charge may be on the basis of about 80 pounds of roasted molybdenite having the approximate analysis given above, to 13 lbs. of calcium oxide, 10 lbs. silica and 5 lbs. of fluorspar. The product resulting from this charge will contain by analysis about 35 to 38% molybdenum combined chiefly with oxygen, 15% calcium oxide, 3% calcium fluoride, 22% silica, and 9.0% iron oxide, the remainder being impurities and oxygen combined with the molybdenum.

While the process as applied to the use of molybdenite is preferably practiced in the manner explained, it will be understood that the fusion or reduction step may be effected in other than an electric furnace, and that the carbon may be present for the reduction of the mass otherwise than in the form of carbon electrodes and furnace linings. If desired, sufficient carbon in the form of coke or charcoal may be added to the furnace charge. Furthermore, it will be understood from the foregoing examples, and from the widely variable amount of fluxing material that may form a part of the composition, that no limits may be placed upon the proportions of the constituents used in forming the composition.

Having reference now to the practice of the invention by the use of wulfenite ore, or in other words lead molybdate, this ore may, without previous treatment except that of concentration where necessary, be directly mixed with the required quantities of fluxing materials to produce, as explained above, any desired form of composition, and the mixture then charged directly into a reducing furnace. The reduction of the mixture results in the formation of a slag overlying the reduced lead, which slag is the preferred form of the composition, namely, a mass containing molybdenum combined chiefly with oxygen and containing also a fluxing agent. This slag may be tapped off and cooled in suitable receptacles to form a coherent hard mass.

As explained in my above mentioned patent application, when the composition produced according to the process disclosed herein includes a fluxing agent, the molybdenum is held in solid solution in the free or combined state by the fluxing agent, and is distributed substantially uniformly throughout the mass. The fluxing agent may include a lime, iron oxide, magnesia, silicate or fluoride, or mixture of silicate and fluoride, with small quantities of alumina forming a calcium, magnesium, aluminum, iron, molybdenum silicate, or silicate and fluoride.

The advantage of the composition produced according to this process is fully explained in my above mentioned patent application. Briefly, the composition is a coherent solid mass which may be introduced directly into an electric or open hearth furnace for alloying molybdenum with another metal, particularly with steel, and in its preferred form it contains fluxing elements which act in the manner previously explained. In other words, the preferred form of the product is self-contained having present molybdenum plus fluxing material, and therefore, requires only the reducing action of the steel bath or of the usual reducing agents to deposit the molybdenum.

Because the molybdenum is present in the composition chiefly in the form of lower oxides, its subsequent final reduction to metal in a furnace takes place very quickly. The composition being a coherent solid mass, no loss of molybdenum is suffered, as is incident to the use of unfused powdery or finely crystalline alloying compositions. In actual use of the composition for alloying molybdenum with steel, it has been found that all but a fraction of 1% of the molybdenum content of the composition alloys with the steel, and that this takes place without producing segregations in the steel and without adding impurities to it.

According to the provisions of the patent statutes, I have described the principle and mode of operation of my invention and have given specific examples of the manner in which it may be practiced. However, I desire to have it understood that, within the scope of the appended claims, the invention may be practiced otherwise than specifically described herein.

I claim:

1. The process of producing a composition for alloying molybdenum with another metal which comprises roasting molybdenite to remove its sulphur content, and then fusing the roasted body and a fluxing agent, including lime, in the presence of a reducing agent to form a coherent fused mass containing a calcium molybdenum silicate.

2. The process of producing a composition for alloying molybdenum with another metal which comprises roasting molybdenite to remove its sulphur content, and then fusing the roasted body and a fluxing agent, including lime and iron oxide, in the presence of a reducing agent to form a coherent fused mass containing a calcium iron molybdenum silicate.

In testimony whereof, I sign my name.

EMIL A. LUCAS.